United States Patent [19]
Casemir et al.

[11] Patent Number: 5,685,548
[45] Date of Patent: Nov. 11, 1997

[54] SEAL FOR TRACK-CHAIN LINK HAVING LUBRICANT FILLED POCKETS

[75] Inventors: Michael Casemir, Hagen; Herbert Schumacher, Gorxheimer Tal, both of Germany

[73] Assignee: Intertractor Aktiengesellschaft, Gevelsberg, Germany

[21] Appl. No.: 659,980

[22] Filed: Jun. 7, 1996

[30] Foreign Application Priority Data

Mar. 8, 1995 [DE] Germany .................. 29 503 964.7

[51] Int. Cl.⁶ .................. F16J 15/38; F16J 15/48
[52] U.S. Cl. .................. 277/205; 277/206 R; 277/215
[58] Field of Search .................. 277/205, 206 R, 277/215

[56] References Cited

U.S. PATENT DOCUMENTS

| | | | |
|---|---|---|---|
| 2,420,929 | 5/1947 | Buffington et al. | 277/205 |
| 2,509,151 | 5/1950 | Kasten | 277/205 |
| 2,884,291 | 4/1959 | Whitten | 277/205 |
| 3,228,705 | 1/1966 | Underwood | 277/206 |
| 4,438,981 | 3/1984 | Harms | 305/14 |
| 4,461,488 | 7/1984 | Harms | 277/92 |
| 5,127,661 | 7/1992 | Franson et al. | 277/152 |

*Primary Examiner*—William A. Cuchlinski, Jr.
*Assistant Examiner*—Christina Annick
*Attorney, Agent, or Firm*—Herbert Dubno

[57] ABSTRACT

A track-chain link has a pin extending along and defining an axis and having a pair of ends and a radially outwardly directed cylindrical outer surface and a bushing coaxially surrounding the pin and having ends set axially inward of the pin ends and forming axially oppositely outwardly directed end surfaces. Structure on each of the pin ends defines an axially inwardly directed end surface axially confronting the respective bushing end surface and a radially inwardly directed inner surface radially confronting the pin outer surface and defining with the pin outer surface, the bushing end surface, and the structure end surface an annular compartment filled with a body of a liquid lubricant. Each compartment is provided with an elastomeric annular seal formed with an inner end surface forming a ridge bearing axially inward on the bushing end surface substantially in line contact, an outer side surface bearing radially outward on the structure inner surface, an inner side surface bearing radially inward on the pin outer surface, and an outer end surface bearing axially outward on the structure end surface.

7 Claims, 1 Drawing Sheet

SEAL FOR TRACK-CHAIN LINK HAVING LUBRICANT FILLED POCKETS

FIELD OF THE INVENTION

The present invention relates to a track chain. More particularly this invention concerns a seal for a link of a track chain.

BACKGROUND OF THE INVENTION

A standard track chain such as described in U.S. Pat. No. 4,461,488 is formed of a succession of links each consisting of a pair of parallel link elements extending along a track displacement direction, a pin extending perpendicular to this direction from one end of one of the link elements to the corresponding end of the other link element, and a tubular bushing extending between the other ends of the link elements parallel to the pin. The ends interconnected by the pin are further apart than the ends interconnected by the bushing, and each pin passes through the bushing of the leading or trailing link. Thus the links are journaled together by the pins fitting in the bushings at a joint capable of transmitting considerable force while being relatively inexpensive to mass produce.

In order to reduce friction in the sliding-surface joint between the inner surface of the bushing and the outer surface of the pin, it is standard to fill this region with a lubricant grease. To keep the grease from leaking out or becoming contaminated, a seal ring and/or labyrinth seal is provided between each projecting pin end and the respective bushing end. This ring is accommodated in a so-called labyrinth compartment formed by structure, typically the end of the link element attached to the pin, the bushing, and the pin.

With the known seals when the link is assembled the seal is compressed between the axially outwardly directed end surface of the bushing and a confronting axially inwardly directed end surface of the compartment-forming structure. Normally during assembly substantially all the compressibility of the seal ring is used so that during subsequent use and some wear the seal ring loses contact with one of the end surfaces axially flanking it. Furthermore the seal ring even when new engages these end surface in broad surface contact so that if the sleeve and ring are twisted out of coaxial alignment, the seal ring loses contact with one or the other end surface.

A further disadvantage of the known system is that during normal use the seal ring is deformed greatly. In the long run this causes it to disengage from the surfaces it is supposed to seal, thereby causing a leak.

OBJECTS OF THE INVENTION

It is therefore an object of the present invention to provide an improved seal ring for a track-chain link.

Another object is the provision of such an improved seal ring for a track-chain link which overcomes the above-given disadvantages, that is which provides an excellent seal over a long service life.

SUMMARY OF THE INVENTION

A chain has a pin extending along and defining an axis and having a pair of ends and a radially outwardly directed cylindrical outer surface and a bushing coaxially surrounding the pin and having ends set axially inward of the pin ends and forming axially oppositely outwardly directed end surfaces. Structure on each of the pin ends defines an axially inwardly directed end surface axially confronting the respective bushing end surface and a radially inwardly directed inner surface radially confronting the pin outer surface and defining with the pin outer surface, the bushing end surface, and the structure end surface an annular compartment filled with a body of a liquid lubricant. According to the invention each compartment is provided with an elastomeric annular seal formed with an inner end surface forming a ridge bearing axially inward on the bushing end surface substantially in line contact, an outer side surface bearing radially outward on the structure inner surface, an inner side surface bearing radially inward on the pin outer surface, and an outer end surface bearing axially outward on the structure end surface.

Thus the one-piece plastic seal ring according to this invention bears against the sleeve end with a very limited annular surface, in effect a line, so that the force with which it engages this end surface and the amount of compressibility are considerable. As a result good sealing contact will be maintained under any normal use conditions.

In accordance with this invention the seal inner end surface has a pair of oppositely angled generally frustoconical inner and outer flanks meeting at a circular line and forming the ridge. The flanks meet at an obtuse angle so that the seal line will be very solid. The seal outer end surface is generally complementarily formed with an outwardly open central groove so that the seal is generally of V-section, giving considerable axial springiness to the seal ring. The seal side surfaces are substantially cylindrical and parallel to the axis and the seal outer side surface is axially longer than the seal inner side surface. Thus both of these side surfaces sit flatly against the respective side surfaces for an excellent sealing effect.

More particularly according to the invention the circular line between the flanks is offset radially inward of a centerline of the seal and the groove has a center offset radially outward from the circular line. Such an offset ensures that axial compression of the seal ring will cause it to grip the pin more tightly than the sleeve, providing an excellent seal. In addition the seal outer end surfaces includes a relatively narrow and annular inner lip and radially outward therefrom a relatively thick and annular outer lip. The inner flank is formed with an array of lubricant-filled pockets distributed angularly around the seal so that even when the seal ring is axially strongly compressed there will be a supply of lubricant available at the interface between the ring and the parts it is sealing.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
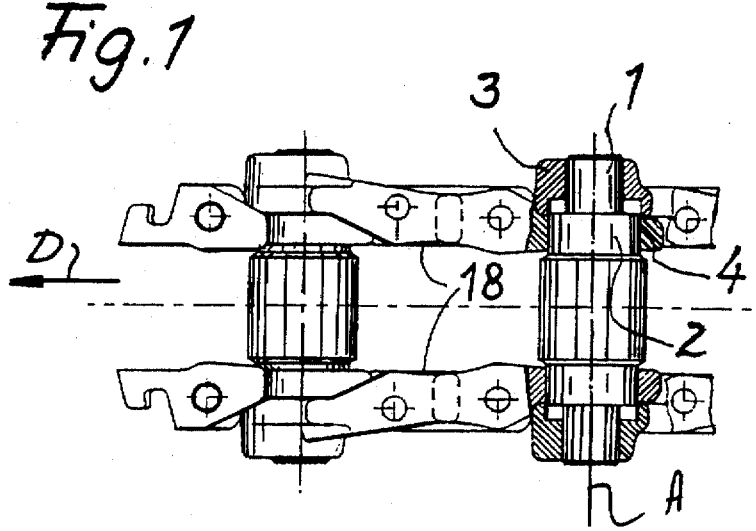
FIG. 1 is a partly sectional top view of a chain link according to the invention.
Figure 2:
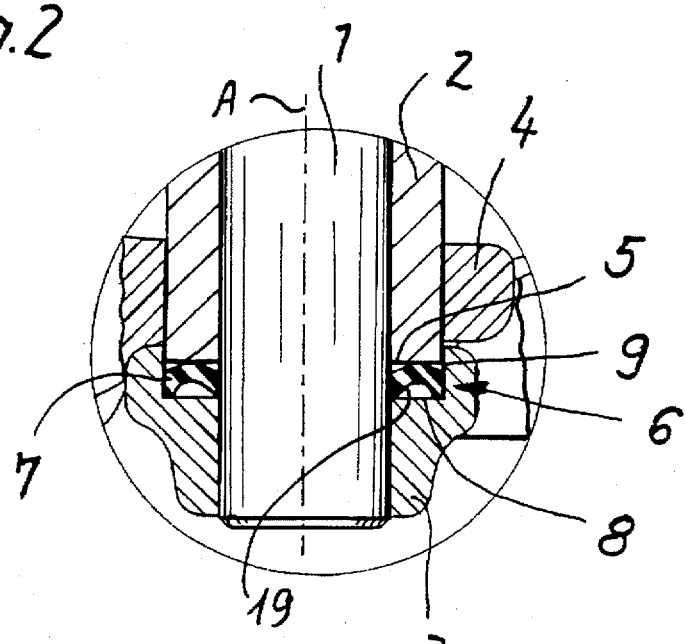
FIG. 2 is an enlarged view of a detail of FIG. 1.

As seen in FIGS. 1 and 2 a chain link according to this invention has a cylindrical pin 1 extending along an axis A inside a cylindrically tubular bushing or bushing 2. Link elements 18 extending in a track displacement direction D have closely spaced rear ends 4 force fitted over the outer ends of the bushings 2 and widely spaced front ends 3 that are force-fitted over the outer ends of the pins 1. The ends 3 are formed as caps that in turn form seal/lubricating (labyrinth) compartments 6 defined between planar axially confronting end surfaces 5 and 8 of the bushing 2 and link end 3 and radially confronting cylindrically annular surfaces 19 and 9 of the pin 2 and end 3.

Figure 3:
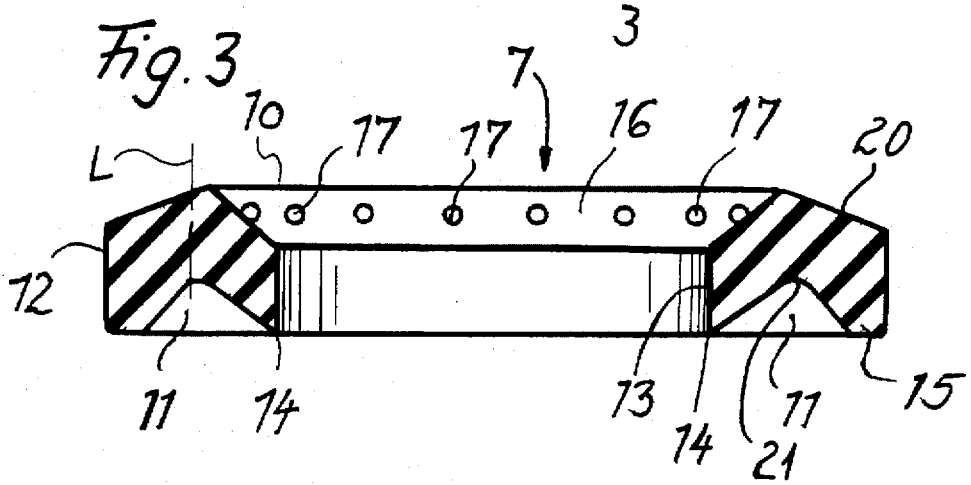
FIG. 3 is a large-scale section taken through the seal of the link.

According to the invention as best shown in FIG. 3 a generally V-section seal ring 7 of elastomeric material is fitted in each compartment 6 along with a supply of a lubricant grease. This seal ring 7 has an axially outwardly directed end surface formed with a V-shaped outwardly open groove 11 defining an inner sharp-edge lip 14 and a wider and planar outer lip 15 that both engage the surface 8. Its axially inwardly directed end surface has a pair of frustoconical flanks 16 and 20 that define a sharp seal edge 10 that engages the surface 5, and the inner flank 16 is formed with an annular array of pockets 17 that hold lubricant. The edge 10 is inward of a centerline L of the seal ring 7 that passes generally through a summit 21 of the outer groove 11. The ring 7 has a relatively short cylindrical inner edge 13 that lies against the outer surface 19 of the pin 1 and a somewhat longer cylindrical outer surface 12 that similarly flatly engages the cylindrical inner surface 9 of the link end 3.

I claim:

1. In a chain having a pin extending along and defining an axis and having a pair of ends and a radially outwardly directed cylindrical outer surface;

a bushing coaxially surrounding the pin and having ends set axially inward of the pin ends and forming axially oppositely outwardly directed end surfaces;

structure on each of the pin ends defining an axially inwardly directed end surface axially confronting the respective bushing end surface and a radially inwardly directed inner surface radially confronting the pin outer surface and defining with the pin outer surface, the bushing end surface, and the structure end surface an annular compartment; and a body of a liquid lubricant in the compartment, an elastomeric annular seal in each compartment and formed with an inner end surface forming a ridge bearing axially inward on the bushing end surface substantially in line contact;

an outer side surface bearing radially outward on the structure inner surface;

an inner side surface bearing radially inward on the pin outer surface; and an outer end surface bearing axially outward on the structure end surface.

2. The chain seal defined in claim 1 wherein the seal inner end surface has a pair of oppositely angled generally frustoconical inner and outer flanks meeting at a circular line and forming the ridge.

3. The chain seal defined in claim 2 wherein the seal outer end surface is formed with an outwardly open central groove, whereby the seal is generally of V-section.

4. The chain seal defined in claim 3 wherein the seal side surfaces are substantially cylindrical and parallel to the axis, the seal outer side surface being axially longer than the seal inner side surface.

5. The chain seal defined in claim 3 wherein the circular line between the flanks is offset radially inward of a centerline of the seal and the groove has a center offset radially outward from the circular line.

6. The chain seal defined in claim 5 wherein the seal outer end surfaces includes a relatively narrow and annular inner lip and radially outward therefrom a relatively thick and annular outer lip.

7. The chain seal defined in claim 3 wherein the inner flank is formed with an array of lubricant-filled pockets distributed angularly around the seal.

* * * * *